United States Patent Office 3,428,616
Patented Feb. 18, 1969

3,428,616
REGENERATIVE POLYMERIC GRIGNARD COMPOSITIONS
Albert H. Greer, Haddonfield, N.J., and Marvin P. Weaver, Parkersburg, W. Va., assignors to Ritter Pfaulder Corporation, Rochester, N.Y., a corporation of New York
Filed May 9, 1966, Ser. No. 548,731
U.S. Cl. 260—88.3    12 Claims
Int. Cl. C08f 27/04, 27/02, 15/02

ABSTRACT OF THE DISCLOSURE

A solid chemically stable polymeric Grignard composition, consisting of the reaction product of a crosslinked polymer containing a plurality of ether, tertiary nitrogen, or N-oxide groups with a Grignard compound This composition is prepared by reacting one mol of a Grignard compound with about 0.1 to about 1 gram equivalent of the polymer, the gram equivalent being based on the ether, tertiary nitrogen or N-oxide groups.

---

Figure 1:
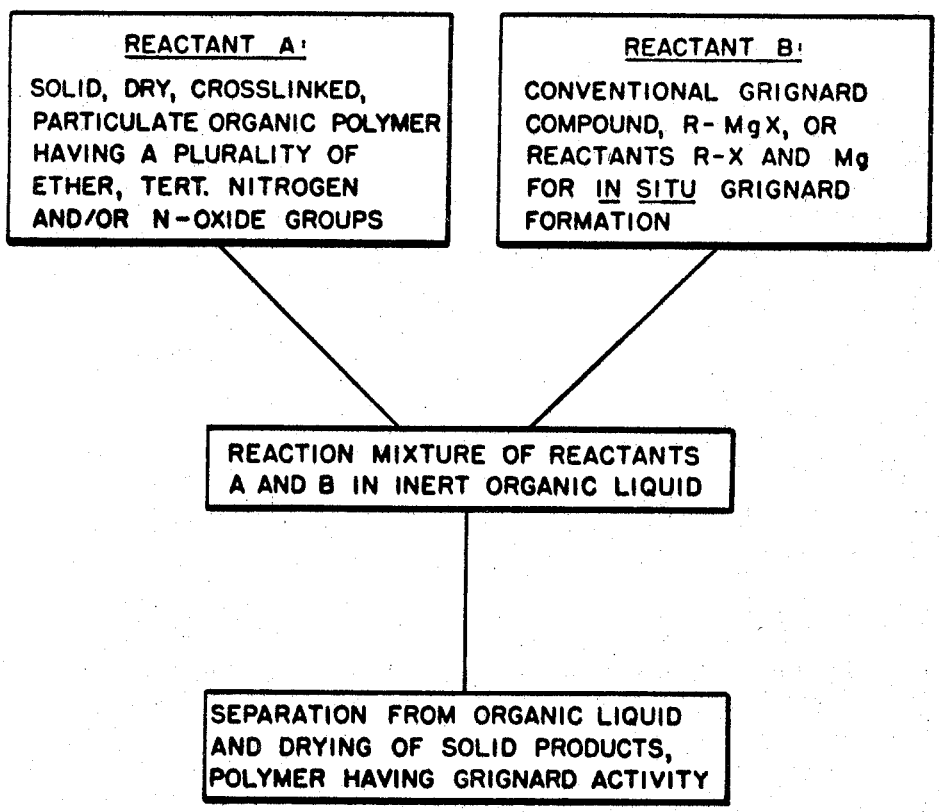

This invention relates to regenerative dry solid organic polymeric Grignard compositions and to a process for their formation and regeneration after use. In particular, this invention relates to the dry solid polymeric Grignard compositions formed as the reaction products of solid particulate cross-linked organic polymers, having a plurality of ether, tertiary nitrogen and/or N-oxide groups, with non-polymeric Grignard compounds or their formative reactants. Further, the invention relates to a simple process for preparing such polymeric Grignard compositions and to a process for regeneration of their Grignard activity following diminution through use.

Conventionally, the organo-metallic-halides which are known as Grignard compounds, are reaction products of reactive hydrocarbon halides with magnesium having the general formula RMgX, in which R is a monovalent hydrocarbon radical, such as an alkyl, alkylene, aryl or aralkyl radical, and X is a halogen atom that may be chlorine, bromine or iodine. They or mixtures of their formative reactants are used in reactions with acids, alcohols, acetylene-type compounds and primary and secondary amines, designated as "other reactants," to provide hydrocarbons of the type RH and the magnesium halide salt of the other corresponding reactant. Grignard compounds also react with oxygen, sulfur and halogens to form substances containing C—O, C—S, and C—X bonds respectively, wherein the carbon atom C is in the R group of the Grignard compound and proximal to the magnesium atom. The products of the latter reactions may, in turn, react with water or hydrogen ion to provide, respectively, R—OH alcohols, R—SH mercaptans and RX'+MgXX' halides. Further, Grignard compounds may react with carbonyl groups to provide addition of the R group of the Grignard to the carbon atom of the carbonyl group and provide compounds

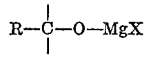

which in turn may be hydrolyzed with water and acid to the corresponding alcohols. Other reactions of Grignard compounds are as set forth for example, by Roberts and Caserio in their "Basic Principles of Organic Chemistry," pages 352 to 363 (W. A. Benjamin Inc., 1965, New York).

The use of conventional Grignard compounds involves sundry disadvantages and inconveniences however, among which may be included the necessary storage and use of such compounds in nominally inert organic liquids, such as diethyl ether, dipropyl ether, tetrahydrofuran, low molecular weight hydrocarbons, etc., in which they are dissolved or slurried. In certain organic liquids, such as ethers, prolonged storage of conventional Grignard compounds invites the formation of peroxides which, in turn, are reactive with the Grignard compounds, thus diminishing their activity, and concomitantly provide serious explosion hazards. Further, at time of use, Grignard compounds that are slurried in an organic liquid require uniform resuspension to provide uniform concentrations of Grignard per unit volume; the consequent errors involved in providing a uniform suspension and thus concentration of Grignard in liquid invites pronounced errors of adding either too little or too much Grignard compound to the reaction mixtures in which they are used. Whatever may be the cause, conventional Grignard compounds, stored in nominally inert organic liquids, are known to lose their Grignard chemical activity with time. As disclosed in U.S. Patent 3,187,061 even those Grignard compositions having enhanced storage stability are shown therein to lose from 12% to 30% of their Grignard activity even within one month.

The present invention seeks to substantially avoid or eliminate the foregoing disadvantages and inconveniences. Therefore, it is an object of the present invention to provide a dry solid Grignard composition which substantially retains its Grignard chemical activity during long periods of storage even in excess of one year.

A further object of this invention is to provide a Grignard composition, which after diminution of its Grignard chemical activity through use, may be regenerated in a simple manner.

Another object of this invention is to provide a simple process for the preparation of a solid, chemically time-stable polymeric Grignard composition, and further to provide a simple process to regenerate the Grignard activity of such compositions which has been diminished by use in conventional Grignard reactions.

Other desirable objects and advantages are inherent in or are readily apparent from the following explanations, equations, structural formulae, examples and the accompanying drawings.

Figure 2:
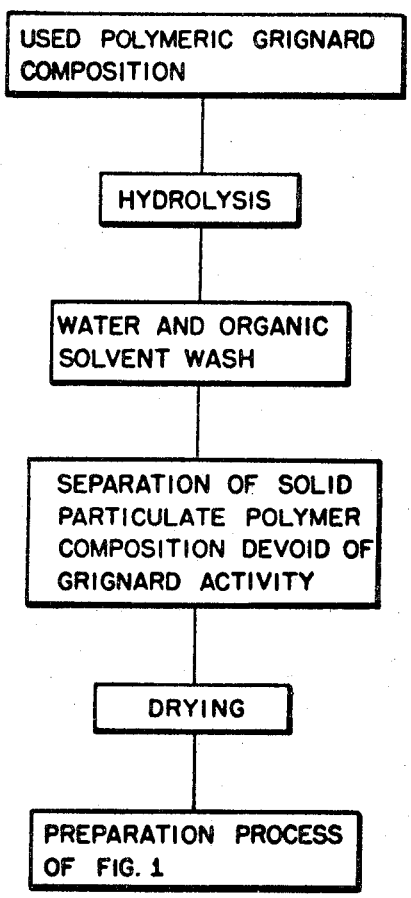

FIG. 1 is a flow diagram of the preparation process of the invention, and FIG. 2 is a flow diagram of the regeneration process.

The objects of this invention, it is now found, are substantially attained by reacting a solid, particulate, cross-linked organic polymer having a plurality of ether, tertiary nitrogen and/or N-oxide groups with at least one conventional Grignard compound of the type R—MgX wherein R and X are previously defined representations. The conventional Grignard compounds also may be formed in situ at the time of reaction with the foregoing polymers. The products obtained thereby are particulate solids which show Grignard chemical activity in those reactions in which conventional Grignard reagents are commonly employed, such as those given above and those in the aforementioned reference, "Basic Principles of Organic Chemistry." The solid compositions of this invention, when stored dry in the absence of substances which ordinarily react with Grignard compounds, such as water vapor, substantially retain their original Grignard reactivity for long periods of time, even exceeding one year.

The present compositions have the following advantages, in practical use, over prior art Grignard compounds: they are free flowing, particulate solids which may be stored dry; they retain their original Grignard chamical activity over periods of prolonged storage; thus they may be precisely measured at time of use in precisely weighed quantities having reproducible Grignard reactivity; they require no slurrying or resuspension and thus eliminate the concomitant measurement errors and solvent hazards that otherwise obtain with prior art compositions. Further, use and storage of the present compositions substantially eliminate the health and explosion hazards that might otherwise exist in employing and storing prior art compositions in organic liquids.

Yet further, after use in Grignard reactions, the present compositions may be regenerated for reuse by a simple process which comprises contacting the exhausted composition with acid or base to regenerate the polymeric reactant component, neutralizing excess acid or base remaining, washing and drying the polymeric reactant component, and then reacting it once again with a conventional Grignard compound according to the preparative process of this invention.

The polymeric Grignard compositions of this invention can be reacted with other reactants under conditions known in the art which usual Grignard compounds undergo to form, for instance, acids, alcohols, esters, acetals, etc., which in turn can be used to form other useful compounds used in the organic field such as pharmaceuticals, plastics, perfumes, and other fine chemical usages.

The preparative process of the present invention involves the reaction of solid, particulate, cross-linked organic polymers having a plurality of ether, tertiary nitrogen and/or N-oxide groups with at least one conventional Grignard compound. The contact times and temperatures are not critical but should be such as to produce compositions having Grignard chemical activity.

Although the exact modes of reaction are not fully understood at the present time, it is believed that the reactions follow those depicted, respectively, in Equations 1, 2 and 3 below.

(1) Grignard compound with polyether solid polymer

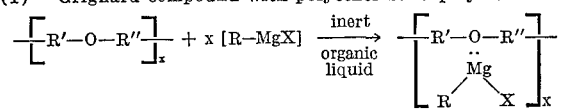

(2) Grignard compound with poly(tertiary nitrogen) solid polymer

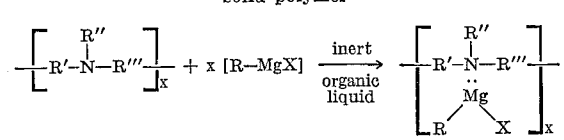

(3) Grignard compound with poly(N-oxxide) solid polymer

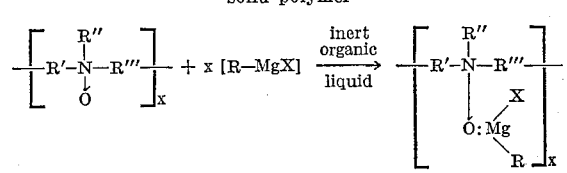

Therein, R', R'' and R''' are organic groups that may be alkyl, alkylene, aryl, or aralkylene in nature. The Grignard polymeric products of this invention as in Equations 1, 2 and 3 may be used in conventional Grignard reactions, for example in reaction with a ketone such as depicted respectively in Equations 4, 5 and 6.

(4)

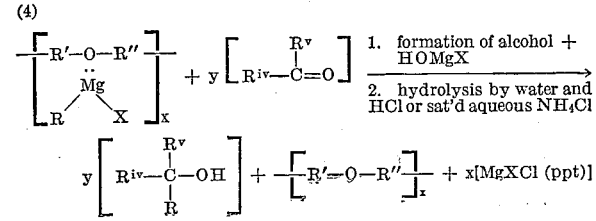

(5)

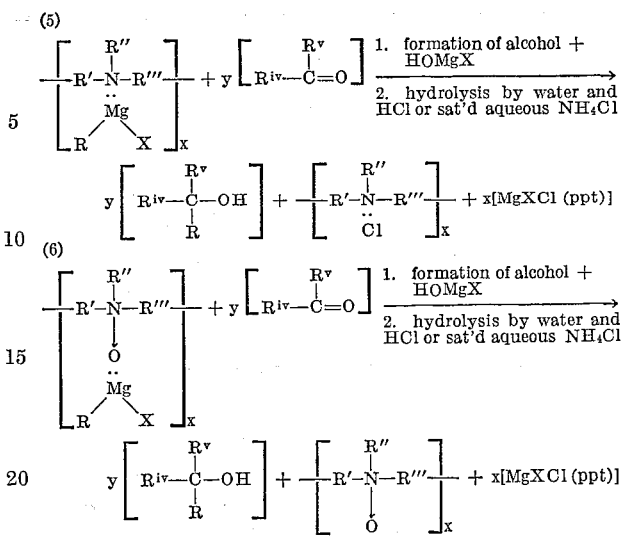

(6)

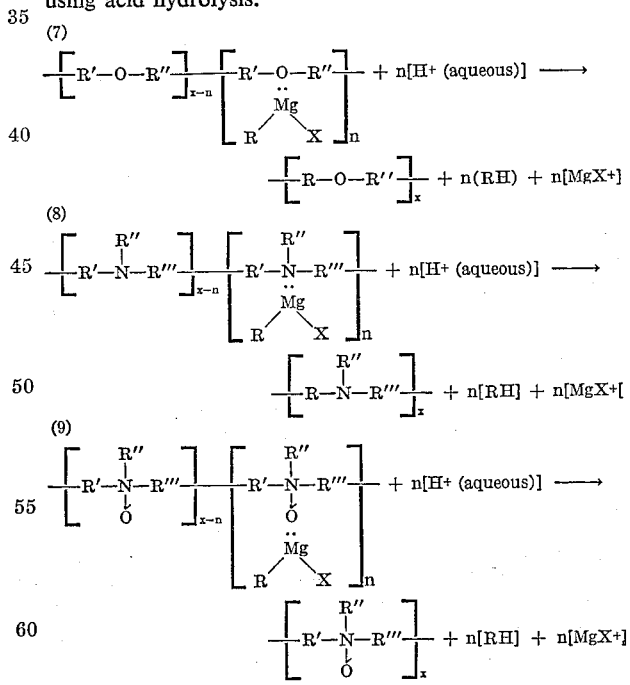

Therein $R^{iv}$ and $R^v$ are organic groups that may be alkyl, alkylene, aryl or aralkyl. The polymeric Grignard compositions produced after use are of diminished Grignard chemical activity and usually contain some repeating units containing Grignard activity and some which do not. Hydrolysis destroys the residual Grignard activity and reconstitutes the polymeric reactant, which upon removal of excess acid or base, is suitable for regeneration as shown in reactions 1, 2 or 3 to substantially restore their original Grignard activity. Such reconstitution of the polymeric reactant is depicted below in Equations 7, 8 and 9 using acid hydrolysis.

(7)

(8)

(9)

The solid particulate polymeric reactant is thus reconstituted, and its Grignard activity is then regenerated in accord with the process of the invention, i.e. the reactions depicted in Equations 1, 2 and 3, and FIGS. 1 and 2.

In the present process for preparing dry polymeric Grignard compositions, the polymeric reactants (Reactant A of FIG. 1) are solid particulate cross-linked organic polymers having a plurality of ether, tertiary nitrogen, and/or N-oxide which may be prepared according to known and conventional methods, such as by solution, suspension and/or bulk polymerization techniques. The polymerization reactions for preparing typical polymer reactants containing, respectively, a plurality of ether, tertiary nitrogen and N-oxide groups are generally depicted in Equations 10, 11 and 12.

(10)

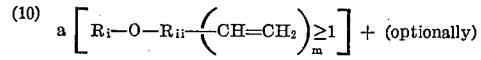

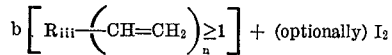

1. free radical generating initiator, or → a solid crosslinked polyether polymer, 2. BF₃ type

(11)

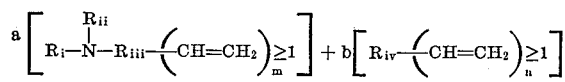

free radical generating initiator → a solid crosslinked poly (tert. nitrogen containing) polymer, or BF₃ type

(12) polymer product of equation 11 + H₂O₂ ⟶ a solid crosslinked poly(N-oxide containing) polymer,

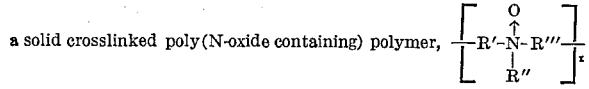

The useful polymers so provided desirably are cross-linked to impart insolubility, and, in general, are prepared from monomers containing at least one polymerizable vinyl group. Crosslinking may be produced employing monomers containing a plurality of polymerizable olefinic groups and/or by iodine such as is disclosed in U.S. Patent 2,927,914.

In general, proportions of monomers found useful to prepare the solid crosslinked poly(ether, tert. nitrogen and/or N-oxide group containing) polymer reactants include from about 60 to 100 mol percent of at least one ether, tertiary nitrogen and/or N-oxide containing vinyl or polyvinyl monomer and from about zero to 40 mol percent of at least one divinyl containing comonomer, useful as a crosslinking agent. The preferred solid crosslinked poly(ether, and/or tert. nitrogen group containing) polymer reactants contain about 85 to 99.9 weight percent contributed by a monovinyl (ether, and/or tert. nitrogen group containing) monomer and about 0.1 to 15 weight percent contributed by crosslinking polyvinyl monomers. The most preferred polymers contain about 92 to 99 weight percent contributed by the monovinyl (ether and/or tert. nitrogen group containing) monomers, and the balance contributed by the crosslinking monomers.

The minimum amount of crosslinking to be provided is that required to afford insolubility to the resulting polymer in any of the solvents used to prepare standard Grignard compounds and also insolubility in any of the common solvents which are used in the reactions of the conventional Grignard compounds with various other functional types of compounds requiring Grignard treatment.

The monovinyl unsaturated monomers used to prepare polymers which are suitable to practice the process of this invention include the following: vinylalkylethers, such as methylvinylether, ethylvinylether, butylvinylether and similar unsaturated compounds; vinylcycloalkylethers such as vinylcyclohexylether, vinylcyclopropylether, and similar unsaturated compounds; vinylarylethers, such as vinylphenylether and the substitute derivatives of the aryl moiety such as nitro, alkyl, and similar non-Grignard-reactive substituents; the monovinylcyclic oxygen-containing ethers such as the vinylfuranes and similar unsaturated compounds; the bicyclic oxygen-containing ethers such as vinylspirobi(meta-dioxane) and similar compounds. Another class of suitable monovinyl monomers includes the vinyl alkyl tertiary amines such as vinyl-N,N-dimethylamine, vinyl-N,N-diethylamine and the like; also the vinyl alkaryl amines, such as vinyl benzyl-N,N-dimethylamine, vinyl benzyl-N,N-diethylamine and the like. It will also be apparent that suitable intermediate monovinyl compounds may be used to form a suitable polymer which upon further reaction will provide desired tertiary nitrogen groups on the polymer. As an example, it is possible to use vinyl benzyl chloride as the monovinyl monomer, and after copolymerization with a suitable crosslinking agent the polymer can be further reacted with a suitable dialkyl or diaryl amine such as dimethylamine or diethylamine to form the polyvinyl tertiary amine. The foregoing vinyl benzyl chlorides can be formed into a preformed crosslinked polystyrene matrix to provide the benzyl chloride moiety by chloromethylation via the Freidel-Craft reaction. Subsequently, the chloromethylated crosslinked polystyrene is aminated with a suitable dialkyl, diaryl or alkaryl amine. Another class of suitable monovinyl monomers would be the N-oxide derivatives of the aforementioned monovinyl tertiary amines. It is also apparent that intermediary monomers may be used to form the polymers followed with amination and converting the amine to the N-oxide derivatives by known peroxide processes. In addition, the acid salts of the amines may be used. Another class of suitable tertiary nitrogen group containing monovinyl monomers include the nitrogen heterocyclic compounds such as the vinylpyridines, 2-vinylpyridine, 4-vinylpyridine, 3-vinylpyridine, 2-methyl-5-vinylpyridine and similar unsaturated compounds; the vinylquinolines such as 2-methyl-5-vinylquinoline, 4-methyl-5-vinylquinoline, 4-methyl-4-vinylquinoline, and vinylpyrrolidones; in addition the acid salts of the pyridine monomers may be used. Another class of suitable monovinyl monomers include the N-oxide derivatives of nitrogen heterocyclic compounds such as the N-oxide vinylpyridines: 2-vinylpyridine N-oxide, 4-vinylpyridine N-oxide, 3-vinylpyridine N-oxide, 2-methyl-5-vinylpyridine N-oxide and similar unsaturated compounds. The N-oxide of the vinylquinolines such as 2-methyl-5-vinylquinoline N-oxide, 4-methyl-4-vinylquinoline N-oxide. Thus the N-oxide containing polymer reactants of the invention may be formed from N-oxide containing monomers or as in Equation 12.

Among the polyvinyl crosslinking agents which may be used are those compounds containing two or more vinyl groups such as divinylbenzene, divinyltoluene, divinylnaphthalene, divinylethylbenzene, divinylxylene, and any polyvinyl crosslinking agent which will not react with Grignard compounds. Monomers containing more than two vinyl groups are also suitable as crosslinking agents, such as trivinylbenzene, trivinylnaphthalene and trivinylanthracene. The divinyl and trivinyl compounds may be nuclear nitrated or alkylated. Another class of suitable compounds containing in addition to the desired functional groups i.e. ether, tertiary nitrogen and/or N-oxide groups, for reaction with standard Grignard compounds, at least two or more polyvinyl groups and which may act as its own crosslinking agent in a homopolymer type of polymerization are the polyvinyl ethers such as divinylether, 3,9-divinylspirobi(meta-dioxane), divinylether of ethylene glycol and divinylether of polyethylene glycol and the like. Another class of suitable compounds which possess the desired functional groups for Grignard compound reaction and which have two or more vinyl groups for crosslinking are the divinylpyridines.

Monomers containing two or more vinyl groups attached to an aliphatic chain may also be used as crosslinking agents, such as diallylphthalate, ethylene glycol diacrylate, ethylene glycol dimethacrylate, diallyl maleate, diallyl fumurate, diallyl succinate, diallyl carbonate and the like; N'-methylenedimethacrylamide, N,N'-dimethylene diacrylamide and the like.

Any suitable free radical generating initiator may be employed as a catalyst to activate polymerization, such as ozone, oxygen, organic peroxides, such as cetyl peroxide, tertiary butyl hydroperoxide, benzoyl peroxide, hydrogen peroxide, so-called "per-salts" such as water soluble persulfates and the azoketonitriles such as azo-bis-isobutyronitrile, azo-bis-cyclopropylpropionitrile, etc. Other catalysts such as boron trifluoride and the so-called cationic catalysts may be used. These catalysts may be used as a complex such as boron trifluoride etherate, boron trifluoride pyridine and similar type of complexes.

The catalyst may be used in suitable amounts ranging from 0.1%–2% by weight based on the weight of the monomeric materials to be polymerized.

Suitable methods for preparation and cross-linking typical polymer reactants useful in pursuing the process of the present invention are conventional, such as those disclosed in U.S. Patents 2,549,921 and 2,927,914 among others.

The polymerization of the copolymer or the homopolymer may be performed in the standard fashion known in the art either by bulk, solution, emulsion or suspension type of polymerization. The choice of the method and the type of the catalyst used in these particular polymerizations will depend on the type of monovinyl or divinyl polymerizable material that is used.

In the case of the vinylpyridines crosslinked with a polyvinyl monomer, the preferred method is suspension polymerization of the monovinylpyridine with the crosslinking agent in water with agitation; heat applied and any sutable free radical generating catalyst such as benzoyl peroxide or azo-bis-diisobutyronitrile is added to the organic phase. In addition, a suspending agent or a protective colloid is added to the aqueous phase to prevent agglomeration of spheroidal particles formed during the polymerization. Similarly, this technique can also be applied to the homo-polymerization of the divinyl ethers of ethylene glycol.

In the polymerization of the vinyl alkyl ethers, it is found that the method as described in U.S. Patent 2,549,921 can be used. The polyvinylalkylether polymers thus obtained may then be crosslinked with iodine using the method described in U.S. Patent 2,927,914. In brief, the alkylvinylethers are dissolved in benzene and polymerized with a small quantity of aluminum hexahydrosulfate, precipitating the formed polymer with methanol and then drying the polymer. The dry polymer is crosslinked with iodine in benzene solution with heating until a gel is formed. The solvent is removed and the gel is further heated yielding a tough black polymer which is insoluble in benzene. In the preparation of the homopolymers using a polyvinyl polymerizable monomer where the free radical type of catalysis cannot be used, it is found expedient to use the Freidel-Craft type catalyst such as $BF_3$, $TiCl_4$, $AlCl_3$, and the like. It is preferred to use the boron trifluoride etherate complex. Using this type of polymerization the monomers are dissolved in toluene and the polymerization is performed at from —75° C. to room temperature in the presence of small quantities of boron trifluoride etherate. After allowing to stand for several hours, filtering, washing with acetone and with water, the polymeric reactant materials are dried and found to be insoluble in common solvents.

In the preparation of a polybenzyltertiary amine crosslinked with a polyvinyl monomer the preferred method is suspension polymerization of styrene with a crosslinking agent in water with agitation; heat is applied and any suitable free radical generating catalyst may be added to the organic phase. In addition a suspending agent or a protective colloid may be added to the aqueous phase to prevent agglomeration of the spheroidal particles formed during the polymerization. The polymer is washed and dried and then subjected to a Freidel-Craft reaction with chloromethylether and a suitable catalyst such as anhydrous aluminum chloride to form the chloromethyl crosslinked polystyrene. After washing, the chloromethylated product is reacted with a suitable alkyl or aryl secondary amine such as dimethylamine to form the desired tertiary amine.

For the purpose of the invention, it is not necessary to use freshly polymerized polymer. It has been found that the aforementioned polymers and homopolymers when cleaned with an appropriate solvent and a minor amount of hydrochloric acid to remove possibly occluded magnesium, may be reused over again using the present process for regenerating a polymer with Grignard chemical activity without substantial loss of capacity or reactivity. The polymer can also be recycled with a Grignard reagent which is entirely different from the previously contained Grignard complex.

Conventional Grignard compounds, according to the preparation process of the invention, are reacted with the foregoing polymers. Any suitable prior art Grignard compound may be so employed, such as those known in the art ordinarily prepared by reacting an alkyl, cycloalkyl, alkenyl, alknyl, arakyl, alkaryl or aryl organic halide, for instance, methyliodide, methyl bromide, ethyl bromide, phenyl bromide, etc. with magnesium powder or flakes usually in a solvent medium selected from the class of dialkyl ethers, cyclic oxygen-containing aliphatic compounds, cyclic sulfur-containing aliphatic compounds, alkyl aryl ethers, dialkyl ethers of ethylene glycols, tertiary alkyl amines and pyridine or its alkyl derivatives. The general procedure as described by Rochow et al., "The Chemistry or Organo-Metallic Compounds," John Wiley & Sons Inc. (1957), p. 86 and/or by the method shown in "Organic Synthesis Collective—vol. I," John Wiley & Sons Inc. (1941), p. 226 may be used. In the reaction of the solid cross-linked particulate organic polymers with conventional Grignard compounds, the degree of Grignard chemical activity of the product composition of this invention may be controlled by varying the ratio of concentrations of reactants, that is to say varying the ratio of the number of gram equivalent weights in ether, tertiary nitrogen and/or N-oxide groups of polymer used to the number of mols of Grignard compound used; and also by varying the effective time in which the aforesaid polymers and Grignard compound reactants are in contact with one another, desirably in an organic solvent such as used for the preparation and storage of conventional Grignard compounds; and further by varying the effective temperature of the reaction mixtures; and yet further by varying the particle size of the particulate polymeric reactant. In pursuing the process of the invention, the polymeric reactant and the conventional Grignard compound, in an inert organic solvent, are mixed or contacted for effective time periods from about 0.1 to 148 hours at effective temperatures of about 15 to 100° C. in ratios of .1 to 1 gram equivalents of polymer based on ether, tertiary nitrogen and/or N-oxide content to 1 mol of Grignard compound. At the end of the effective reaction interval, the solid polymeric reaction products having Grignard activity are separated from the inert organic liquid by conventional means, such as filtration and/or volatilization of the organic liquid, and dried to remove organic liquid which may adhere to the polymer, thus affording a dry particulate free flowing organic polymeric composition of this invention having Grignard activity.

The following examples, which illustrate the process to form the present Grignard compounds, the nature of the polymeric Grignard compositions of the invention, and the process to regenerate Grignard activity in exhausted compositions of this invention, are presented merely to demonstrate practice of the invention, but not to limit its scope.

EXAMPLE 1

(A) Preparation of polymeric reactant A

The polymerization initiator catalyst, aluminum hexahydrosulfate, was prepared by reacting 50 g. of aluminum sulfate dissolved in a minimum amount of water and 16 g. of concentrated sulfuric acid. The reaction product was evaporated to dryness. The dry mixture was further heated in an oven at 170° C. for 4 hours and stored. The monomers, n-butylvinylether and isobutylvinylether, distilled between 93.5 to 94° C. and 83 to 83.5° C. respectively, were used. To 50 g. of dry benzene were added 5 g. of distilled n-butylvinylether, 5 g. of isobutylvinylether and 0.1 g. of aluminum hexahydrosulfate. The temperature increased slowly from 20° C. with a concomitant increase in the biscosity of the solution. The temperature was raised and maintained at 60-70° C. for 3 hours. The solution obtained was treated with methanol to precipitate the dissolved polymer, which was filtered and then dried at 100° C. for 6 hours affording a yield of 7 g. (70% of theoretical).

The dried polymer was heated in benzene with 2 g. of crystalline iodine under reflux until a gel formed. The gel was separated by filtration and heated to 100° C. for 6 hours. A tough rubbery black polymer (A) was obtained and found to be insoluble in benzene, indicating that appropriate crosslinking had taken place.

(B) Preparation of polymeric composition having Grignard chemical activity

Five grams (0.39 mole) of the crosslinked resin (A) was reduced to −20 +30 mesh and suspended in 50 g. of dry diethyl ether containg 5 g. of magnesium metal flakes (0.21 mole). Slow addition of 30 g. of methyl iodide (0.21 mole) was made over an hour period. The reaction mixture was then heated to reflux for 4 hours, at about 32° C. A sample of the reaction products was removed, washed with diethyl ether, weighed, added to 10 ml. of 0.2 N $H_2SO_4$ and allowed to stand for 15 minutes. The solution obtained was then back titrated with 0.2 N NaOH to determine the amount of residual acid in excess of that reacting with the polymer's Grignard moieties. The resin was found to have a Grignard chemical activity equivalent to 0.2 meq. of methyl magnesium iodide per gram of polymer. The remaining reaction mixture containing the resin and the Grignard components was heated at reflux, e.g., about 32° C., for an additional 16 hours. The resin product of the extended reaction period was found to have an activity of 0.5 meq. of methyl magnesium iodide per gram of polymer.

EXAMPLE 2

(A) Preparation of polymeric reactant 2A

To ten grams of butylvinylether in 50 gms. of dry benzene was added 0.1 gm. of aluminum hexahydrosulfate polymerization initiator catalyst. The temperature increased rapidly and cooling was necessary to prevent foaming. After the initial reaction exotherm had subsided, heating was maintained for one hour at reflux, e.g. about 32° C. The product mixture was cooled and the polymer reactant 2A was precipitated with methanol, and then dried at 100° C. for 6 hours affording a yield of 9 g. (90% of theoretical). The dried polymer was then dissolved in 50 g. of benzene and 5 g. of crystalline iodine was added. The mixture was then heated to 70 to 80° C. and maintained thereat until a dark gel formed. The solid material was separated from its liquors and placed in an oven at 100° C. for 16 hours to dry. The dried resin obtained was black, rubbery and insoluble in benzene and afforded a yield of 12 g.

(B) The preparation of Grignard polymeric composition

Five grams of crosslinked polymer (0.39) mole 2A and 25 g. of diethyl ether were admixed with 5 gms. of magnesium flakes (0.21 mole). Methyl iodide, 30 g. (0.21 mole), was slowly added thereto at reflux temperatures, e.g. about 32° C. Benzene was added and the solvents were then removed by filtration. Titration of a sample of the resin, by the method described in paragraph (B) of Example 1, gave a Grignard chemical activity equivalent to 0.4 meq. of methyl magnesium iodide per gram of resin product.

EXAMPLE 3

(A) Preparation of polymer reactant 3A

A solution of 22 g. of divinylether in 222 g. of toluene was cooled to −75° C. A solution of 40 gms. of boron trifluoride etherate catalyst in 50 gms. of toluene, cooled to −75° C., was slowly added to the divinylether solution. Gel formation was immediate. The mixture was stirred at −75° C. for an additional hour. The gel was filtered from its liquors, and washed with acetone and then water until all acidity had been removed. The gel on drying formed a light yellow powder, poly(divinylether) polymeric product 3A, in 100% yield. It was found that the yellow powder 3A was also suitably insoluble in toluene and benzene.

(B) Preparation of Grignard polymeric composition

About 7.1 g. of magnesium flakes (0.29 mole), 100 ml. of dry diethyl ether and a crystal of iodine were admixed in an inert environment. About 42 g. (0.27 mole) of methyl iodide was slowly added. Addition took approximately 1 to 2.5 hours and was made at reflux temperatures of about 32° C. To the clear gray solution obtained 22 g. of poly(divinylether) polymer 3A, a 1:1 ratio of ether equivalents to moles of Grignard compound, was added with 50 g. of dry diethyl ether. The reaction mixture was then heated at reflux temperatures of 32° C. for 16 hours. The ether liquor was removed under vacuum. The Grignard polymeric dry solid product remaining, when titrated according to the procedure described in paragraph (B) of Example 1, was found to have a Grignard chemical activity equivalent to 4.4 meq. of methyl magnesium iodide per gram of polymer composition.

EXAMPLE 4

(A) Preparation of polymer reactant 4A

About 20 g. of boron trifluoride etherate dissolved in 100 gms. of dry toluene was admixed in an inert environment with 10 g. of 3,9-divinylspirobi(meta-dioxane) dissolved in 50 gms. of toluene. The temperature of the reactant mixture increased from ambient to 33° C. with formation of a brown gel. Reaction was allowed to continue for about 72 hours of contact time producing a solid polymeric material. This was filtered from its liquors, washed with acetone, and then water to remove any residual acidity. The resuling solids were then dried at 100° C. for 3 hours affording 10 g. (100% yield) of a light yellow powdery polymeric reactant 4A.

(B) Preparation of Grignard polymeric composition

About 2.4 g. of magnesium flakes (0.1 mol), 50 g. of dry diethyl ether and a crystal of elemental iodine were admixed in an inert environment. About 14.2 g. (0.1 mol) of methyl iodide was then added. After 1.5 hours, addition of the methyl iodide was complete. The reaction mixture was heated for an additional hour at 32° C. to form a clear gray solution, and very little magnesium remained. To this was added 10 g. of polydivinylspirobi (meta-dioxane) polymer 4A (0.05 mol). The mixture was heated with stirring for 12 hours under reflux at about 32° C. This was followed with removal of the excess etherial solution under vacuum at room temperature, until a dry particulate polymeric product remained. Titration, as described in paragraph (B) in Example 1, showed that the equivalent Grignard activity was 2.8 meq. of methyl magnesium iodide per gram of polymer composition.

A sample of the Grignard polymeric composition was allowed to stand in an otherwise sealed container. Samples were taken from time to time to determine the Grignard chemical time stability of the composition. The following table shows these results:

| No. of days: | Activity equivalent to meq. of methyl magnesium iodide/g. of composition |
|---|---|
| 0 | 2.65±0.2 |
| 42 | 2.72±0.2 |
| 104 | 2.70±0.2 |
| 308 | 2.53±0.2 |
| 600 | 2.80±0.2 |

EXAMPLE 5

(A) Preparation of polymer reactant 5A

About 250 g. of water containing a sufficient amount of sodium borate buffer to maintain a pH of 9 was admixed with 1 g. of gelatin, and the resulting solution was heated to 70–75° with stirring. A mixture of 50 g. of the divinyl ether of ethylene glycol and 0.5 g. (1 wt. percent) of azo-diisobutyr-o-nitrile dissolved therein was added to the aqueous buffered gelatin solution. Hard, spherical polymer beads formed within about one hour, and settled overnight. The white polymer produced, reactant 5A was filtered, rinsed with acetone, and dried at 100° C. affording a yield of 40 gms., 80% of a benzene insoluble particulate polymer, reactant 5A.

(B) Preparation of Grignard polymeric composition

About 7.1 g. (0.3 mol) of magnesium flakes suspended in 50 gms. of dry ethylether containing a crystal of iodine was admixed with a few drops of methyl iodide to initiate reaction. After reflux temperatures had been attained, 43 g. (0.3 mol) of methyl iodide was added over a 2 hour period. At the end of this time, 40 g. of polymer reactant 5A (0.25 mol) was added, and the entire mixture was heated under reflux for 12 hours. Excess ether was removed under vacuum, and the material was further dried under a stream of nitrogen. The resulting polymer had a Grignard activity equivalent to 3.0 meq. of methyl magnesium iodide per gram of polymer composition.

EXAMPLE 6

About 30 g. of the Grignard polymer composition prepared as in Example 5 and 100 g. of dry diethyl ether were admixed in an inert environment. Over a period of one hour, 10 g. of benzaldehyde dissolved in 20 g. of dry diethyl ether was slowly added, the temperature increasing from 25° to reflux at about 35° C. Reflux temperatures were maintained overnight. Upon cooling, 100 ml. of 10% aqueous ammonium chloride solution was added, followed by 5 ml. of concentrated HCl. The solid polymer was separated by filtration. The filtrate was treated with an additional 2 ml. of concentrated HCl to solubilize any insoluble magnesium compounds. The clear solution was washed with 100 ml. of 10% aqueous sodium thiosulfate solution followed with 10% aqueous sodium bicarbonate solution followed with water. The water was removed by drying. The solids which precipitated were anhydrous magnesium sulfate. The ether was removed under vacuum leaving approximately 6 g. of a yellow oil which proved to be phenylmethylcarbinol. This was confirmed by infra-red spectral comparison with an authentic sample of phenyl-methylcarbinol.

EXAMPLE 7

Forty-six grams (0.22 mol) of polydivinylspirobi(meta-dioxane) reactant 4A was treated with 0.46 mol of methyl magnesium iodine as was previously described. The Grignard activity was found to be equivalent to 2.8 meq. of methyl magnesium iodide per gram of polymer composition.

The dry resin Grignard composition was admixed with 100 g. of dry diethyl ether and cooled to 0–10° C.; paraphenylbenzaldehyde, 18.3 g., (0.1 mol) dissolved in 200 g. of dry diethyl ether was added over a period of one hour at 0–10° C. The reaction mixture was then allowed to stand at room temperature overnight and then was heated to reflux for one-half hour. The mixture was cooled to 0° in an ice bath containing saturated aqueous ammonium chloride to keep the temperature below 34° C. The reaction mixture was then filtered, and the filter cake extracted with hot benzene. The etherial filtrate and the benzene extract were combined and evaporated to dryness on a steam bath. The crystalline product obtained was then recrystallized from a mixture of benzene and petroleum ether. The crystals obtained were then washed with petroleum ether affording a yield of 10.5 g., 52.5 wt. percent, of white crystalline para-phenylmethylphenylcarbinol with a melting point of 93° C. (literature 96 to 97° C.) and a recovery of 44 gms. of polymer reactant 4A suitable for regeneration of its Grignard activity.

EXAMPLE 8

The polymer reactant 4A used in Example 7 was treated with acetone and 10% aqueous hydrochloric acid, followed with a 5% aqueous sodium bicarbonate wash. The reactant 4A was then washed with demineralized water, and dried at 100° C. An additional 2 g. of fresh polymer was added making the total amount 46 g. (0.22 mol) of polymer reactant 4A. Polymer reactant 4A was reactivated with 0.46 mol of methyl magnesium iodide, according to the process of paragraph B of Example 4, and the excess ether was removed by nitrogen sweeping until a free-flowing product resulted. The Grignard activity was found to be equivalent to 2.8 meq. of methyl magnesium iodide per gram of Grignard polymer composition. This was similar to the activity of the original Grignard polymer composition. One hundred grams of dry diethyl ether was added to the dry Grignard polymer composition. About 18.3 gr. (0.1 mol), of recrystallized para-phenylbenzaldehyde dissolved in 200 gms. of ethyl ether was added thereto at 0–10° C. over a period of one hour. The reaction mixture was then heated to reflux for 2 hours, cooled, and 200 ml. of saturated aqueous ammonium chloride was added. The solid reaction products were filtered, and the filter cake obtained was extracted with hot benzene. The combined filtrate and extract liquors were evaporated. A crystalline product remained which was then redissolved in benzene and reprecipitated with petroleum ether affording a yield of 17 g., 85.5%, of white crystalline paraphenylmethylphenylcarbinol having a melting point of 94–95° C. (literature values melting point 96–97° C.). The recovered solid polymer reactant 4A weighed 46 gms., and again was suitable for regeneration of Grignard chemical activity by the process of this invention.

EXAMPLE 9

(A) Preparation of Grignard polymer composition

About 12 g. of flake magnesium (0.5 g. atom), 50 g. of dry diethyl ether, and a crystal of iodine were admixed in an inert environment. A small portion of a solution containing 80 g., 0.51 mole, of bromobenzene, dissolved in 50 g. of dry diethyl ether, was added to initiate reaction. It was also found necessary to use heat. Subsequent addition of the remainder of bromobenzene solution soon maintained reflux temperatures, and required approximately 2 hours. The reaction mixture was held at reflux overnight. A reddish-brown solution was obtained and was then added to 50 g. (0.24 mol) of dry polydivinylspirobi(meta-dioxane) polymer reactant 4A. Excess ether was removed under vacuum, followed with nitrogen sweeping. A free-flowing yellow polymer was obtained thereby which had a Grignard activity equivalent to 2.88 meq. of phenyl magnesium bromide per gram of polymeric Grignard composition.

(B) Preparation of diphenyl carbinol

The polymeric Grignard composition prepared as in paragraph (A), was suspended in 100 g. of dry diethyl ether in a flask which had been previously swept out with nitrogen. To the suspension was then added 21.2 g., 0.2 mol, of benzaldehyde dissolved in 100 g. of dry diethyl ether in a one hour addition at 0–10° C. After addition of the benzaldehyde, the reaction mixture was heated to reflux for 2 hours and then cooled. About 200 ml. of saturated aqueous ammonium chloride was added. The reaction mixture then was filtered, and the filter cake obtained was washed with hot benzene. The combined filtrates were evaporated on steam bath, leaving a crystalline solid product which was subsequently washed with petroleum ether. The product, white crystals of diphenyl carbinol weighing 20.5 gms. was obtained in 55% yield, and had a melting point of 63–64° C., versus a reported literature M.P. of 68–69° C.

EXAMPLE 10

(A) Preparation of polymer reactant 10A

About 1000 ml. of water containing sufficient buffer to maintain a pH of 10 was charged with a sufficient amount of a stabilizer such as gelatin, casein, calcium phosphate, carboxyethyl cellulose and the like to prevent later agglomeration of the dispersed phase. The mixture was heated to 70° C. A monomer mixture composed of 203 g. of 2-methyl-5-vinylpyridine, 18.9 gms. (to provide 4.5% crosslinking) of 53 weight percent divinylbenzene, the remainder being substantially ethylvinylbenzene, and 1.7 gms. of azo-bis-isobutyronitrile was added to the water to form a dispersion which was maintained with a stirrer speed that would yield polymer granules of a screen size between 30 and 60 mesh, U.S. Standard Sieve. At the end of 3 hours polymerization was complete, the material polymer reactant 10A was then filtered, washed with water and dried at 100° C.

(B) Preparation of Grignard polymeric composition

In a 3-necked flask which has been purged with nitrogen gas, 12 gms. of magnesium flakes (0.5 gm. atom), 50 g. of dry diethyl ether and a crystal of iodine was added followed with a few drops of methyl iodide to initiate the reaction. During 2 hours, 71 g. (0.5 mol) of methyl iodide was added followed with heating at reflux for 1 hour. A clear gray solution resulted, which was decanted into a flask containing 62 g. (0.5 mol) of pulverized cross-linked polymethylvinylpyridine described in paragraph (A). Excess ether was purged by nitrogen gas. After 24 hours, the material was vacuum dried for 6 hours and found to have a Grignard activity equivalent to 2.3 meq. of methyl magnesium iodide per gram of polymeric composition.

EXAMPLE 11

(A) Preparation of polymer reactant 11A

In a suitable flask equipped with a stirrer, dropping funnel, and thermometer were placed 105 g. of cross-linked poly-2-methyl-5-vinylpyridine divinylbenzene copolymer described in paragraph (A) of Example 10 and 1500 ml. of glacial acetic acid. The mixture was heated to 60° C. whereupon 60 ml. of a 50% hydrogen peroxide aqueous solution was added during one hour. Heating was then continued at 60° C. for an additional two hours. The solid material, an N-oxide group containing polymer reactant 11A, was separated from the mixture by filtration, washed with water and dried at 105° C.

(B) Preparation of the Grignard polymeric composition

In a suitable flask that had been flushed out with nitrogen was placed 12 g. (0.5 g. atom) of magnesium flakes, 50 g. of dry diethyl ether, a crystal of iodine and a drop of methyl iodide. The mixture was heated to initiate the reaction and 71 g. (0.5 mol) of methyl iodide was added at reflux for one hour. At the end of this time, 60 g. of the dry polymethylvinylpyridine N-oxide polymer described in paragraph (A) was added and excess solvent removed by nitrogen purging until a free-flowing product was obtained in a quantitative yield. The Grignard activity was equivalent to 2.2 meq. of methyl magnesium iodide per gram of polymeric Grignard composition.

EXAMPLE 12

In a suitable flask equipped with stirrer, thermometer, a gas inlet tube and a reflux condenser were placed 24 g. (1.0 g. atom) of magnesium flakes, 200 g. of dry diethyl ether, and a crystal of iodine. The flask was purged with nitrogen gas and a small quantity of methyl bromide was bubbled into the reaction until refluxing of the diethyl ether started. The reaction required approximately 6 hours when during this time 146 g. (1.0 mol) of methyl bromide was consumed. The dark gray solution was decanted into a 2-liter flask and 120 g. (1.0 mol) of dry polymethylvinylpyridine N-oxide polymer described in paragraph (A) of Example 11 was added. After the reaction had subsided the excess ether was purged off with nitrogen to yield a free-flowing product weighing 260 g. and found to have a Grignard activity of 3.65 meq. of methyl magnesium bromide per gram of polymer composition.

EXAMPLE 13

In a suitable flask that had been dried and purged with nitrogen was placed 96 g. of magnesium flakes (4.0 g. atom) 400 g. of dry diethyl ether, a crystal of iodine and the system further purged with nitrogen. Methyl bromide gas was then bubbled into the reaction at a rapid rate until the reaction was initiated to maintain reflux. The reaction was completed in 6 hours after an uptake of approximately 440 gms. of methyl bromide. The solution was transferred to a single-necked round bottom flask which contained 480 g. (2.4 mol) of polydivinylspirobi (meta-dioxane), the polymer reactant described in paragrap (A) of Example 4. After the reaction ceased, the excess ether was purged with nitrogen, and distilled using a cold reflux condenser. The Grignard polymeric composition remaining after drying was found to weigh 1130 g. and had a Grignard activity equivalent to 3.1 meq. of methyl magnesium bromide per gram of polymer composition.

EXAMPLE 14

Sixty grams of polymer reactant 10A which had been prepared as described in paragraph (A) of Example 10, was converted to the acetate salt. The salt was added to a 0.5 mole solution of methyl magnesium bromide in dry diethyl ether solution. After effective contact, the ether was removed under vacuum and with nitrogen purging. The free-flowing Grignard polymeric composition product weighed 130 g. and had an activity equivalent to 3.6 meq. of methyl magnesium bromide per gram of polymeric composition.

EXAMPLE 15

(A) Preparation of polymer reactant 15A

In a polymerization flask equipped with a stirrer, thermometer and reflux condenser was placed 1200 ml. water, sufficient buffer to yield a pH of 11 and sufficient stabilizer to prevent agglomeration of the polymer beads. The solution was warmed to 65° C. A mixture of 364 g. of styrene, 36 g. of ethyleneglycoldimethacrylate and 1.4 g. of azo-bis-isobutyronitrile dissolved therein was added to the aqueous phase with agitation to provide a polymer bead of substantially 30–60 mesh U.S. sieve. After several hours the polymer reactant 15A thus formed was filtered, washed with water and dried at 105° C. for several hours.

In a suitable flask equipped with a stirrer, thermometer, and drying tube were placed 100 g. of polymer prepared as described in the previous paragraph and allowed to swell in 400 g. of propylene dichloride. After full expansion 100 g. of monochloromethylether was added followed with 58 g. of anhydrous aluminum chloride added over a period of 1 hour at 25° C. The mixture was heated to 50° C. for 4 hours. Reaction was then quenched by reducing the temperature with ice-water, filtered and washed.

The chloromethylated polymer produced, was suspended in water containing a slight molar excess of diethylamine and allowed to react for several hours to provide a tertiary aminated polymer reactant 15A. This was filtered, neutralized with acid and washed with water, and dried.

(B) Preparation of the polymeric Grignard composition

Approximately 19 g. (0.1 mol) of dried particulate polymer from paragraph (A) was added to a suitable flask that had been swept with nitrogen containing 30 g. of diethyl ether solution containing 11.9 gms. (0.1 mol) of methyl magnesium bromide. After an effective contact interval of 1 hour, the excess solvent was removed under vacuum and the polymeric Grignard composition produced was dried under nitrogen to form a free-flowing resin. The Grignard activity was equivalent to 2.5 meq. of methyl magnesium bromide per gram of polymer product.

EXAMPLE 16

In a suitable flask that had been dried and purged with nitrogen were placed 6 g. of magnesium flakes (0.25 g. atom), 100 g. of dry thiophene-free benzene and 18 g. of dry tetrahydrofuran (0.25 mol). A crystal of iodine was then added followed by the addition of gaseous methyl bromide. During the addition of the methyl bromide, cooling was necessary to control the reaction. After 30 minutes the reaction became cloudy and after one hour it was necessary to add an additional 9 g. of tetrahydrofuran to maintain a clear solution. The clear red-brown solution was then decanted from a small quantity of unreacted magnesium. The solution weighed 195 g. and had a Grignard activity of 1.06 meq./gm. of solution. One hundred ninety-five grams of the solution which contained 0.2 mole of methyl magnesium bromide was placed in a 1 liter round bottom flask and there was added 25 g. of polydivinylspirobi(meta-dioxane) reactant 4A. The flask was heated in a rotating flash evaporator until the polymer became free-flowing. The polymer yield was 88 g. with a Grignard activity of 2.06 meq. of methyl magnesium bromide per gram of polymer product. This represented a conversion of 86% of the Grignard reagent to the polymer.

EXAMPLE 17

In a suitable flask that had been dried and purged with nitrogen were placed 6 g. (0.25 g. atom) of magnesium flakes, 150 g. of dry thiophene-free benzene, 18 g. of dry tetrahydrofuran (0.25 mol) and a crystal of iodine. While the flask was being purged with nitrogen, bromobenzene was slowly added. It was necessary to warm the flask to initiate the reaction, then it was maintained by a dropwise addition of the bromobenzene during the remainder of the reaction until 39 g. (0.25 mol) had been added. A dark red solution resulted with a small quantity of unreacted magnesium remaining. The Grignard solution was found to weigh 191 g. with a Grignard activity of 1.1 meq./g. of solution. Into a dry 1 liter flask was placed 90 g. (0.1 mol) of the phenyl magnesium bromide solution as prepared above in paragraph A followed with 18 g. (0.1 mol) of dry polymethylvinylpyridine N-oxide polymer described in paragraph A of Example 11. This resulted in a mild exothermic reaction. When the reaction had subsided, the remainder of the solvent was removed by nitrogen until a free-flowing condition had been attained. The yield was 55 g. of polymer. The Grignard activity was 1.82 meq. of phenyl magnesium bromide per gram of polymer composition. The efficiency of conversion was found to be 100%.

The active polymeric Grignard composition obtained, as described in the previous paragraph, was added to a 500 cc. flask containing 100 cc. of dry benzene. A small amount of solid carbon dioxide was slowly added and then the solution was heated at reflux for 2 hours and cooled. A saturated aqueous ammonium chloride solution was added and the entire mixture acidified with hydrochloric acid. The reaction mixture was then filtered and the filter cake washed with benzene. The benzene filtrate was then dried by evaporation and the resulting crystals were found to be benzoic acid after recrystallization from methanol.

We claim:
1. A solid, particulate, crosslinked organic polymeric composition having Grignard chemical activity comprising the reaction product of a solid, particulate crosslinked polyvinyl polymer containing a plurality of chemical groups selected from the class consisting of ether, tertiary nitrogen and N-oxide with a Grignard compound selected from the class consisting of R—Mg—X and magnesium in combination with an R—X compound in an inert organic liquid, wherein R is an organic group selected from the class consisting of alkyl, alkylene, aryl and aralkyl groups and X is a halogen selected from the class consisting of chlorine, iodine and bromine, said polymer and said Grignard compound being in the ratio of 1 mol of said Grignard compound to about 0.1 to about 1 gram equivalent of said polymer based on said polymer chemical groups.

2. A composition according to claim 1 wherein said plurality of chemical groups are ether groups.

3. A composition according to claim 2 wherein said ether groups are linear in nature.

4. A composition according to claim 2 wherein said ether groups are alicyclic in nature.

5. A composition according to claim 1 wherein said plurality of chemical groups are tertiary nitrogen groups.

6. A composition according to claim 5 wherein said tertiary nitrogen groups are pyridinyl nitrogen groups.

7. A composition according to claim 5 wherein said tertiary nitrogen groups are pyridonal nitrogen groups.

8. A composition according to claim 5 wherein said tertiary nitrogen groups are tertiary amine groups.

9. A composition according to claim 1 wherein said plurality of chemical groups are N-oxide groups.

10. A process for preparing a solid particulate organic polymeric composition having Grignard chemical activity comprising:
(a) contacting a solid crosslinked polyvinyl polymer containing a plurality of chemical groups selected from the class consisting of ether, tertiary nitrogen and N-oxide groups with a Grignard compound selected from the class consisting of R—Mg—X and magnesium in combination with an R—X compound, wherein R is an organic group selected from the class consisting of alkyl, alkylene, aryl and aralkyl groups and X is a halogen selected from the class consisting of chlorine, iodine, and bromine, in an inert organic liquid, said polymer and said Grignard compounds being in the ratio of 1 mol of said Grignard compound to about 0.1 to about 1 gram equivalent of said polymer based on said chemical groups for an effective time interval at an effective temperature to provide a solid particulate organic polymeric composition product having Grignard chemical activity; and (b) separating said product from said organic liquid.

11. A process according to claim 10 wherein said separating includes drying said solid product.

12. A process according to claim 10, wherein said solid polymer is first hydrolyzed and then dried to insure that said polymer is substantially devoid of Grignard activity prior to reaction with said Grignard compound.

References Cited

UNITED STATES PATENTS 2,962,476  11/1960  Verburg _____ 260—91.1
2,984,655  5/1961  Kirk _____ 260—91.1

JOSEPH L. SCHOFER, *Primary Examiner.*

HARRY WONG, JR., *Assistant Examiner.*

U.S. Cl. X.R.

260—47, 88.5, 89.7, 88.1, 86.1, 78.5, 80.3, 91.1